J. G. HODGSON.
LACQUERED OR PROTECTIVE COATED CAN.
APPLICATION FILED MAR. 18, 1907.
1,094,899.
Patented Apr. 28, 1914.
2 SHEETS—SHEET 1.
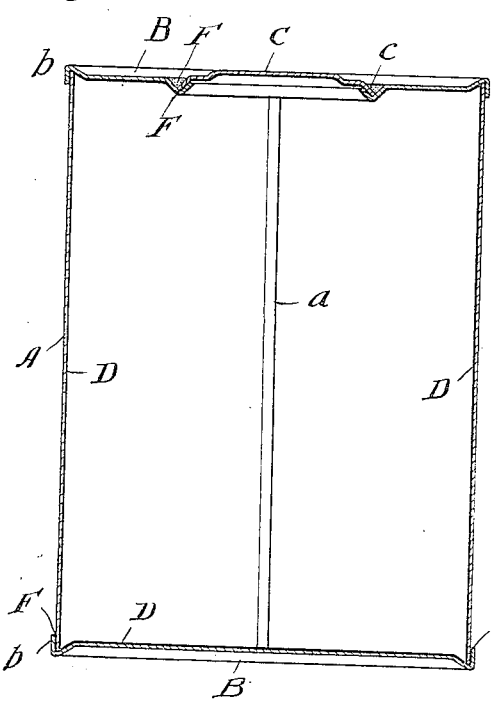
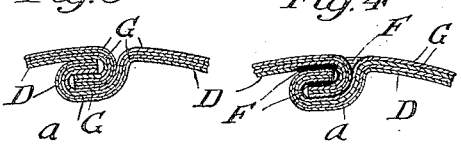
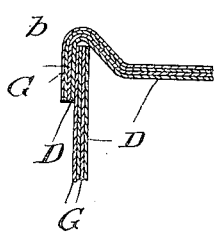
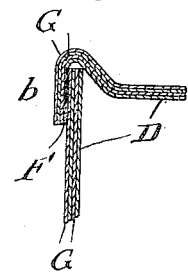
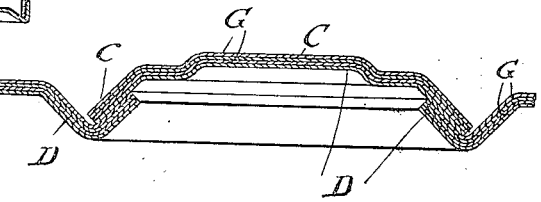
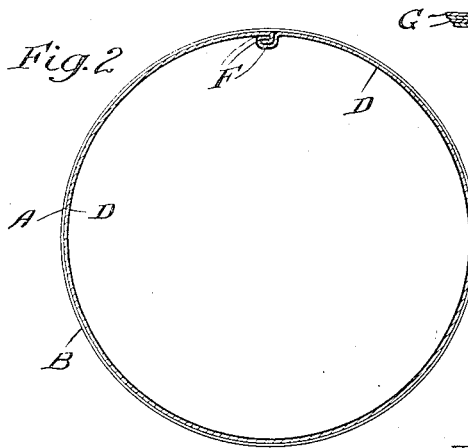
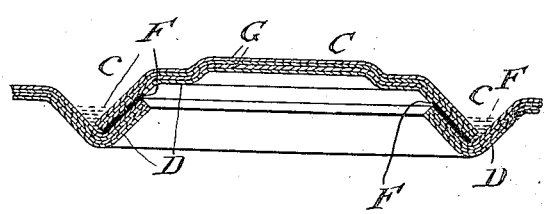
Witnesses:
Wm. Geiger
H. M. Munday
Inventor:
John G. Hodgson
By Munday, Evarts, Adcock & Clarke
Attorneys J. G. HODGSON.
LACQUERED OR PROTECTIVE COATED CAN.
APPLICATION FILED MAR. 18, 1907.
1,094,899.
Patented Apr. 28, 1914.
2 SHEETS—SHEET 2.
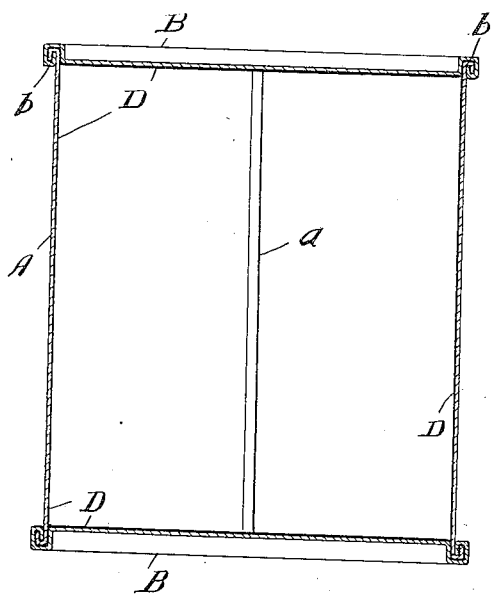
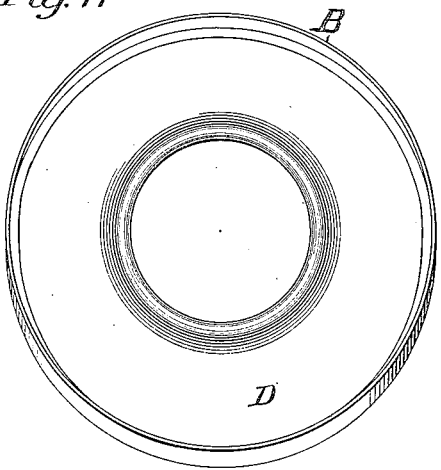
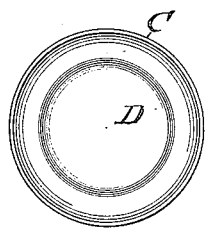
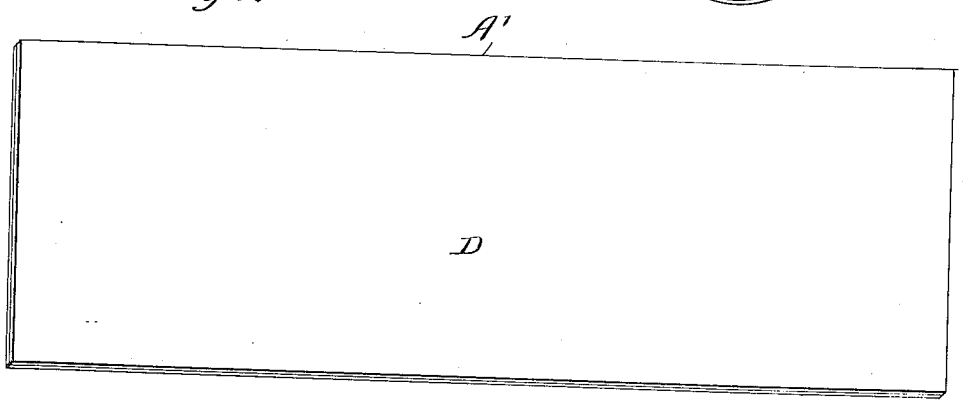
Witnesses:
Wm. Geiger
Inventor:
John G. Hodgson
By Munday, Evarts, Adcock & Clarke
Attorneys

UNITED STATES PATENT OFFICE.

JOHN G. HODGSON, OF MAYWOOD, ILLINOIS, ASSIGNOR TO AMERICAN CAN COMPANY, OF NEW YORK, N. Y., A CORPORATION OF NEW JERSEY.

LACQUERED OR PROTECTIVE-COATED CAN.

1,094,899.

Specification of Letters Patent.

Patented Apr. 28, 1914.

Application filed March 18, 1907. Serial No. 362,944.

*To all whom it may concern:*

Be it known that I, JOHN G. HODGSON, a citizen of the United States, residing in Maywood, in the county of Cook and State of Illinois, have invented a new and useful Improvement in Lacquered or Protective-Coated Cans, of which the following is a specification.

The object of my invention is to provide a lacquered or protective coated can for use in packing or preserving food products, which will be of a simple, efficient and durable construction, capable of being rapidly and cheaply manufactured, in which the seam or seams of the cans may be made perfect and hermetically tight by soldering, in which the solder will not smear, coat or extend over the inside surface of the can adjacent to the seam or seams, in which the protective coating may be applied to the sheets of tin plate from which the cans are formed while they are in the flat, in which the heat or flame of the soldering operation will not burn, blister or injure the protective coating or cause it to crack or peel off, in which the protective coating will extend over the entire interior surface of the can, including body, top and bottom heads, and, also cap, if a separate cap is employed, and in which the protective coating will be dry, hard, solid, firmly adherent, effectually protective, durable under action of acids or other ingredients in the food products, and also odorless, tasteless, flavorless, harmless and sanitary.

My invention consists in the means I have discovered for practically accomplishing this result. I have discovered and demonstrated by my experiments that by coating the sheets of tin plate from which the parts of the can are to be formed, upon one or both sides (according as the protective coating is wanted upon only the inside or upon both inside and outside of the can) with boiled linseed oil, suitably cut or thinned with turpentine or other solvent or drier, while the sheets of tin plate are in the flat, the coating extending over the entire surface of the sheet, and then baking or drying the same in a suitable oven or drier at a temperature of from 300 to 400° Fht., for a period of from two to three hours, until the coating becomes hard, dry, solid, and firmly adherent, that the sheets of tin plate thus treated may then be cut and formed up into can bodies, can heads and can caps, and the parts of the can assembled and the seams soldered, the same as though such protective coating had not been previously applied to the sheets; and that such hard, dry, solid protective coating extending into the seam portions of the can which are to be united by the solder, will not prevent the proper and efficient union of the parts by the solder, or in anyway interfere with the soldering operation, or with the hermetic tightness and perfection of the soldered seams or joints; and also that such dry, hard, solid protective coating will effectually prevent the solder flowing through the seam into and upon the inner surface of the can adjacent to the seam and coating and smearing such portions with solder as has heretofore always taken place to a greater or less extent. And I have further discovered that the heat of the soldering operation will not burn, injure, blister or cause to crack or peal off the protective coating upon the inside of the can at the portions thereof adjacent to the soldered seam or seams; and also that such protective coating acts as an efficient protection against the action of fruit or other acids or ingredients of the ordinary food products customarily packed in cans, and that this protective coating is also odorless, tasteless and flavorless, and has no injurious action upon the food products packed in the cans.

In the accompanying drawing, forming a part of this specification, Figure 1 is a central vertical section of a lacquered or protective coating preserving can embodying my invention. Fig. 2 is a horizontal section. Figs. 3 and 4 are enlarged sections through the side seam before and after soldering. Figs. 5 and 6 are enlarged sections through one of the end seams of the can before and after soldering. Figs. 7 and 8 are enlarged sections through the cap seam before and after soldering. Fig. 9 is a central vertical section showing my invention as applied to an open top can in which the end seams are formed by double seaming instead of by soldering. Fig. 10 is a perspective view of a sheet of tin plate in the flat, furnished with my protective coating. Fig. 11 is a detail perspective view of one of the can heads. Fig. 12 is a detail perspective view of the can cap.

In the drawing A represents the can body, B the can heads and C the can cap.

D is the protective coating on the inner surface of the can body, can heads and can cap, the same being a dry, hard, solid, firmly adherent film of linseed oil, or other equivalent material. This coating D before the side seam $a$, end seam $b$ and cap seam $c$ are soldered, extends into and through the seams or between the members of the seam to be united by the solder. But when the solder, heat and flux are applied to the seam to form the soldered joint or seam, this protective coating has no interfering action to prevent the proper and perfect union of the parts by the solder F, the coating in fact apparently acting itself, in a measure, as a flux, and tending rather to facilitate than to interfere with the soldering operation; and at the same time the protective coating prevents the solder F flowing into the inside of the can through the seam and coating or smearing the inside surface of the can adjacent to the seam with solder, as has heretofore always been the case. The heat and flux employed in the soldering operation does not burn, blister, destroy or injuriously affect the protective coating D adjacent to the can seams, but leaves the same intact and extending over the entire interior surface of the can at the seam as well as elsewhere.

G represents the tin coating of the tin plate sheet A' from which the can heads and can body blanks are cut and formed.

In cans of the open top variety where the top and bottom can heads are united to the can body by double or other folded seams, as illustrated in Fig. 9 the can cap and the soldered seam uniting the can cap to the top head as well as the soldered seams uniting the can heads to the can body, are omitted.

In the drawing it will be understood, by those skilled in the art, that the thickness of the tin plate, the thickness of the tin coating, and the thickness of the protective coating are all greatly exaggerated, this being necessary for clearness of illustration in the drawing.

I claim:

1. A sheet metal preserving can having parts, the edge portions of which are adapted to be united by a solder seam, and provided with a hard, dry, solid, firmly adherent, tasteless, odorless and flavorless, flux-acting protective coating extending to the extreme edges thereof and covering the entire interior surface of the can at the portions within and adjacent to the seam-forming edge portions as well as elsewhere, said flux-acting, protective coating freely permitting the solder, when applied, to displace the same to the extent to which the solder flows into the seam, substantially as specified.

2. A sheet metal preserving can having parts, the edge portions of which are adapted to be united by a soldered seam, and provided with a hard, dry, solid, firmly adherent, tasteless, odorless and flavorless flux-acting protective coating, including linseed oil, extending to the extreme edges thereof and covering the entire interior surface of the can at the portions within and adjacent to the seam-forming edge portions as well as elsewhere, said flux-acting protective coating freely permitting the formation of the soldered seam, substantially as specified.

3. A sheet metal preserving can having parts, the edge portions of which are adapted to be united by a solder seam, and provided with a hard, dry, solid, firmly adherent, tasteless, odorless and flavorless flux-acting coating extending to the extreme edges thereof and covering also the interior surface of the can, said flux-acting coating enabling the coated seam-forming edge portions to be soldered by being displaced from those portions where the solder flows when applied, substantially as specified.

4. A sheet metal preserving can having body, top and bottom heads, the edge portions of which are adapted to be united by a soldered seam, and each provided with a hard, dry, solid, firmly adherent protective coating extending to the extreme edges thereof and covering also the interior surfaces thereof, including the portions in and adjacent to the seam-forming edge portions, said protective coating acting as a flux to freely permit the formation of the soldered seams, substantially as specified.

5. A sheet metal preserving can having parts, the edge portions of which are adapted to be united by a solder seam, and provided with a hard, dry, solid, firmly adherent, tasteless, odorless and flavorless flux-acting coating, including linseed oil, extending to the extreme edges thereof and covering the entire interior surface of the can, said flux-acting coating enabling the coated seam-forming edge portions to be soldered, substantially as specified.

6. A sheet metal preserving can having parts, the edge portions of which are adapted to be united by a soldered seam, and provided with a hard, dry, solid, firmly adherent, protective coating, including linseed oil, said coating freely permitting parts covered thereby to be soldered, the coating acting as a flux and adapted to be displaced from those portions where the solder is applied, substantially as specified.

7. A sheet metal preserving can having parts, the edge portions of which are adapted to be united by a solder seam, and provided with a hard, dry, solid, freely adherent protective coating of linseed oil and turpentine, said oil and turpentine coating enabling the seam-forming edge portions of the sheet to be freely soldered, substantially as specified.

JOHN G. HODGSON.

Witnesses:
 EDMUND ADCOCK,
 H. M. MUNDAY.